US011663278B2

(12) United States Patent
Xue

(10) Patent No.: US 11,663,278 B2
(45) Date of Patent: May 30, 2023

(54) CLASSIFYING JOB SEARCH QUERIES FOR IMPROVED PRECISION

(71) Applicant: Microsoft Technology Licensing, LLC, Redmond, WA (US)

(72) Inventor: Huichao Xue, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/094,525

(22) Filed: Nov. 10, 2020

(65) Prior Publication Data

US 2022/0147588 A1 May 12, 2022

(51) Int. Cl.
*G06F 16/00* (2019.01)
*G06F 16/9535* (2019.01)
*G06Q 10/1053* (2023.01)
*G06F 16/9538* (2019.01)
*G06F 16/2457* (2019.01)
*G06N 20/00* (2019.01)
*G06F 40/58* (2020.01)
*G06F 16/9032* (2019.01)
*G06Q 50/00* (2012.01)

(52) U.S. Cl.
CPC .... *G06F 16/9535* (2019.01); *G06F 16/24578* (2019.01); *G06F 16/90332* (2019.01); *G06F 16/9538* (2019.01); *G06F 40/58* (2020.01); *G06N 20/00* (2019.01); *G06Q 10/1053* (2013.01); *G06Q 50/01* (2013.01)

(58) Field of Classification Search
CPC ........... G06F 16/9535; G06F 16/24578; G06F 16/90332; G06F 16/9538; G06F 40/58; G06N 20/00; G06Q 10/1053; G06Q 50/01
USPC .................................................. 707/600–899
See application file for complete search history.

(56) References Cited

U.S. PATENT DOCUMENTS

| 2017/0371925 A1* | 12/2017 | Arya ................. G06F 16/24534 |
| 2018/0349440 A1* | 12/2018 | Le ..................... G06F 16/24534 |
| 2019/0258722 A1* | 8/2019 | Guo ................... G06F 16/9024 |
| 2020/0134537 A1* | 4/2020 | Beason ................ G06F 16/355 |

* cited by examiner

*Primary Examiner* — Irete F Ehichioya
*Assistant Examiner* — Shirley D Hicks
(74) *Attorney, Agent, or Firm* — Schwegman, Lundberg & Woessner, P.A.

(57) ABSTRACT

Systems and methods for classifying job search queries for improved precision using a machine-trained classifier are provided. In example embodiments, a network system receives a job search query including one or more terms from a device of a user. The network system extracts one or more features from the job search query, whereby the one or more features are derived from the one or more terms. Based on the one or more features, a machine-learned model of the classifier determines whether to use a title field search process or a compound search process. Based on the determining, the network system formats the job search query into a corresponding machine-language format and performs the job search query to derive results. The network system causes presentation of the results on the device of the user.

18 Claims, 6 Drawing Sheets

CLASSIFYING JOB SEARCH QUERIES FOR IMPROVED PRECISION

TECHNICAL FIELD

The subject matter disclosed herein generally relates to configuring machines for performing search queries. Specifically, the present disclosure addresses systems and methods that classify job search queries for improved precision using a machine-trained classifier.

BACKGROUND

Conventionally, there is a challenge dealing with ambiguities of search queries, especially in a job search embodiment. For example, a term in the search query can mean a title of a job, a skill, or a company. Additionally, searching an entire job posting for matching terms can provide a large portion of results that are irrelevant to the job search query. For example, the matching term may be found in a description portion of the job posting (e.g., reporting to "the term") but is not the type of job the user is searching for.

BRIEF DESCRIPTION OF THE DRAWINGS

Some embodiments are illustrated by way of example and not limitation in the figures of the accompanying drawings.

DETAILED DESCRIPTION

Figure 1:
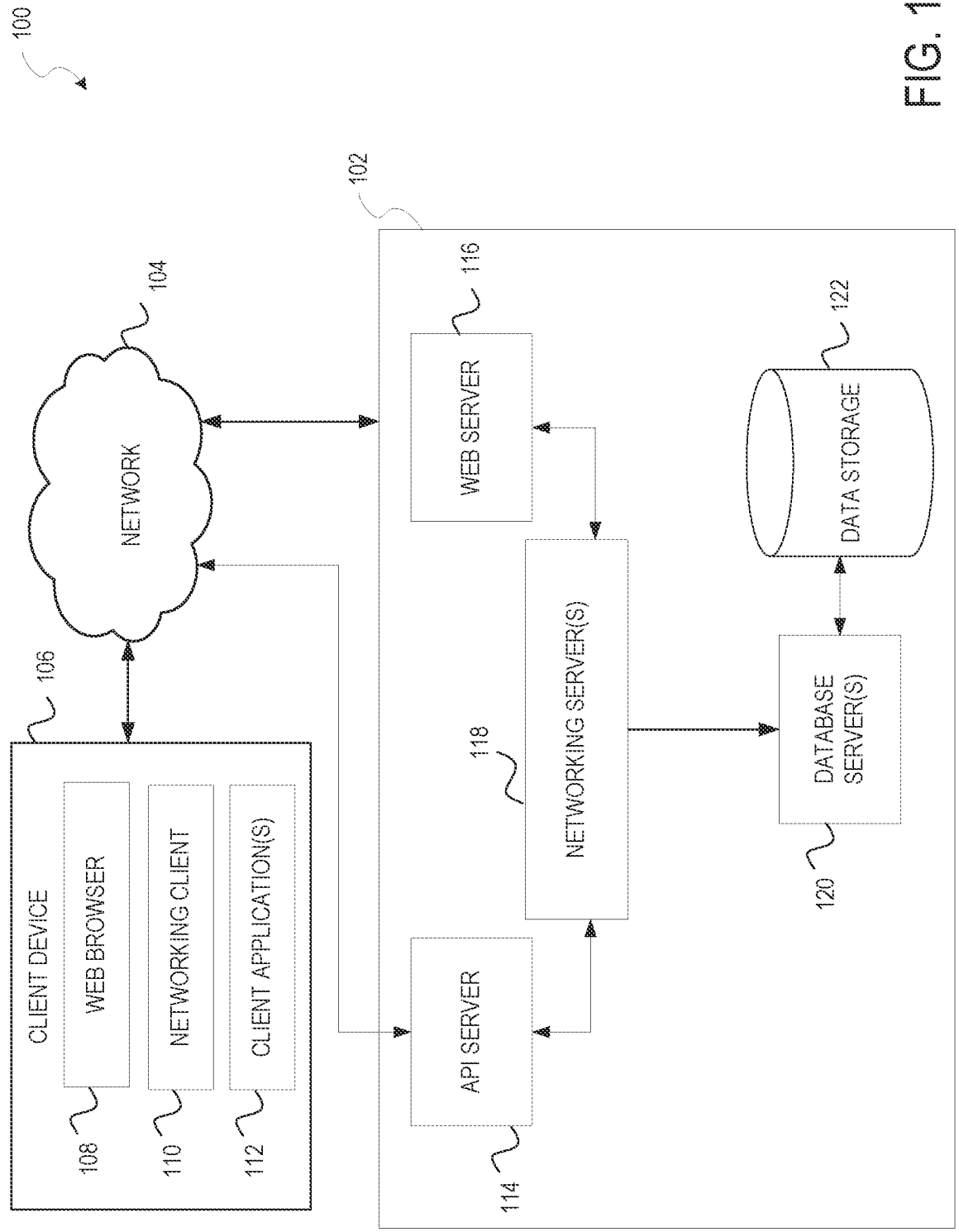
FIG. 1 is a diagram illustrating a network environment suitable for classifying job search queries using a trained classifier, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide systems and methods that machine-train (i.e., using machine-learning) a classifier and that execute search queries for improved precision using a machine-learned model (also referred to as a "machine-trained model") of the machine-trained classifier (also referred to as a "trained classifier"). Classification comprises a process of predicting a class of given data points. The classifier utilizes training data to understand how given input variables relate to the class. Once trained, the classifier can determine what type of search query to perform on a given term or terms that will increase precision while minimizing recall loss. Precision is the fraction of relevant instances among the retrieved instances, while recall is the fraction of relevant instances that have been retrieved over the total amount of relevant instances. Precision and recall are used as a measurement of the relevance of the search results.

Previously when users searched using a term or terms, a conventional search system uses the same template to expand that term or terms into a machine-language query that a search engine can then execute. This can lead to ambiguity inherent in conventional search systems if the term(s) have multiple meanings. For example, the term "google" can trigger a search for a website, a job posting, a skill, or a company. While the results of such a broad search helps users discover countless search results, there is low precision that often leads to inaccurate results or recommendations. Additionally, the large amount (e.g., volume) of results may require more processing (e.g., retrieval and ranking) by the conventional search system in order to organize and present the results to the user. Alternatively, limiting the search to a particular context will reduce the volume of results, but risks missing potentially relevant results that would be found in a broader search.

Example embodiments provide a machine-trained classifier that reduces the number of irrelevant results (thus increasing precision) by determining, by using the machine-trained classifier, whether to limit a search query to a particular context (e.g., a narrow search) or allow a broad search (e.g., based on a plurality of context) to be performed. In one embodiment, the machine-trained classifier is trained to classify job posting searches. Conventionally, a job posting search typically looks for search term(s) in any portion (e.g., context) of a job posting, thus being a broad search. Each job posting can include, for example, a title, a description field, employer information, geolocation, and skills. The description field may comprise multiple sections or contexts including, for example, a description of the position, description of qualifications, and descriptions of responsibilities.

As such, a more general search term may result in a large volume of search results using a broad search that searches, for example, the title, description field, employer information, geolocation, and skills. However, many of the results may not be relevant. For instance, a query for "director" may be matched to description fields of job postings with jobs that are roles reporting to directors or have some other association with a director position. For example, a quality manager position may report to a director of quality or a hospitality recruiter position may have a requirement that the applicant have five years of operations experience in a leadership position such as a regional director. Thus, a search for "director" may result in possibly half of the results not having "director" in the title and being irrelevant to a user that is searching for a director-level position. Additionally, the broad search produces a large volume of results (e.g., a "director" search may provide over 250,000 results) resulting in a downstream ranker having to process more results and likely recommending irrelevant job postings to the user.

Example embodiments provide a machine-trained classifier that reduces the number of irrelevant results (thus increasing precision) by determining whether to limit a search query to a particular context search, such as a title field search (e.g., match to a title field of job postings) or allow a compound search that matches to multiple contexts (e.g., match to title field, job description field, and/or any other information found in job postings). Thus, the machine-trained classifier can restrict certain search queries to title field queries, while allowing other search queries to search against multiple contexts or fields in job postings. For example, by restricting "director" to title field searches, a search system will only retrieve jobs with "director" in the title, which may reduce the number of results that are retrieved. This may result in less processing power in performing the search, less processing power needed to rank the results of the search, and potentially more accurate results or recommendations.

One challenge with using classifiers is managing errors (e.g., risk of making incorrect decisions). For example, performing a title field search may result in 100,000 "director" matches and 3900 "market analyst" matches, while performing a broader search (e.g., multiple context) may result in 200,000 "director" matches and 4000 "market analyst" matches. Thus, restricting the terms "director" and "marketing analyst" to the title field search risk losing recall (e.g., fraction of the total amount of relevant instances that were actually retrieved). However, it is more rewarding to risk the former (e.g., "director") than the latter (e.g., "market analyst") as switching to a title field search can greatly improve the former's results and precision compared to the latter which does not suffer from a high number of irrelevant results. The classifier is machine-trained to incorporate such a risk/return trade-off.

Example embodiments introduce a utility function to train the classifier to focus on examples (e.g., term(s)) that help best improve precision with minimal recall loss. As such, a loss function is used to train the classifier that weighs the returns in learning each query correctly. For instance, a properly machine-trained classifier can reduce a number of retrieved job postings by 10% while only sacrificing 1% recall. The function quantifies a goal to maximize job applications via the search system by defining a probability that a query will help users find a job posting to apply for with a probabilistic model.

Accordingly, the present disclosure provides technical solutions that uses machine-learning to train a classifier to determine whether to perform a title field search or a compound search for each job query. The classifier is trained using job application records that each indicate a previous job search query and a job identifier of a corresponding applied-to job postings. In example embodiments, the classifier extracts query features from the job application records including one or more terms of each previous query of the job application records. The classifier then replays each of the previous queries of the job application records, whereby the replaying comprising performing searches for matching results using both the title field search process and the compound search process based on the one or more terms of each previous query. The results of the replay are applied to a probabilistic model that comprises a probability function and a loss function. The probabilistic model trains the classifier to optimize for overall probability (e.g., obtaining search results that may include a desired job posting) and minimizing loss (e.g., losing search results that may include the desired job posting).

FIG. 1 is a diagram illustrating a network environment 100 suitable for classifying a job search queries using a trained classifier that is trained using machine-learning, in accordance with example embodiments. A network system 102 provides server-side functionality via a communication network 104 (e.g., the Internet, wireless network, cellular network, or a Wide Area Network (WAN)) to one or more client devices 106. In example embodiments, the client device 106 is a device of a user that is a member of a networking platform (e.g., a social network platform) provided by the network system 102. In example embodiments, the network system 102 comprises components that host and manage the networking platform. Additionally, the network system 102 trains the classifier and performs job searches using the trained classifier to classify the search query as will be discussed in more detail below.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the client device 106 comprises a display module (not shown) to display information (e.g., in the form of user interfaces). In further embodiments, the client device 106 comprises one or more of a touch screen, accelerometer, camera, microphone, and/or Global Positioning System (GPS) device.

The client device 106 may include one or more applications (also referred to as "apps") such as, but not limited to, a web browser 108, a networking client 110, and other client applications 112, such as a messaging application, an electronic mail (email) application, a news application, and the like. In some embodiments, if the networking client 110 is present in the client device 106, then the networking client 110 is configured to locally provide a user interface for the application and to communicate with the network system 102, on an as-needed basis, for data and/or processing capabilities not locally available. Conversely, if the networking client 110 is not included in the client device 106, the client device 106 may use the web browser 108 to access the network system 102.

In example embodiments, the user of the client device 106 accesses the network system 102 in order to access a network platform and network connections (e.g., social network connections). Further still, the user can perform searches, including a job search on the network platform as will be discussed in more detail below.

Turning specifically to the network system 102, an application programing interface (API) server 114 and a web server 116 are coupled to, and provide programmatic and web interfaces respectively to, one or more networking servers 118. The networking server(s) 118 host the network platform, which may comprise one or more modules, applications, or engines, and which can be embodied as hardware, software, firmware, or any combination thereof. The networking servers 118 are, in turn, coupled to one or more database servers 120 that facilitate access to one or more information storage repositories or data storage 122. In one embodiment, the data storage 122 is a storage device that stores content (e.g., user profiles including connections and posts; previous searches, applied-to jobs) that is used by the network system 102. The networking server 118 will be discussed in more detail in connection with FIG. 2.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
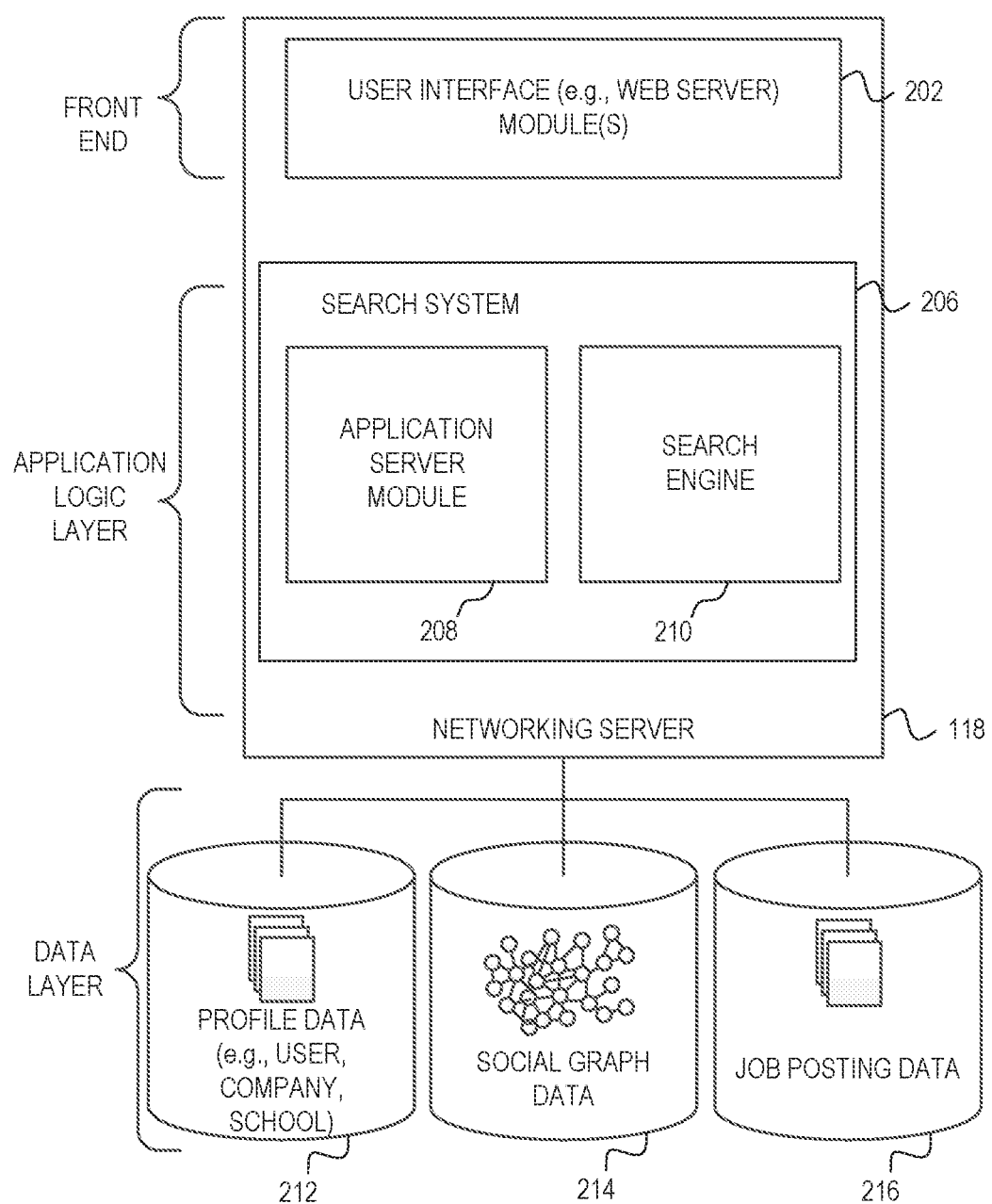
FIG. 2 is a block diagram illustrating components of a networking server, according to some example embodiments.

Moreover, any two or more of the components illustrated in FIG. 1 may be combined, and the functions described herein for any single component may be subdivided among multiple components. Additionally, any number of user devices 106 may be embodied within the network environment 100. While only a single network system 102 is shown, alternative embodiments may contemplate having more than one network system 102 to perform server operations discussed herein for the network system 102. FIG. 2 is a block diagram illustrating components of the networking server 118, according to some example embodiments. In various embodiments, the networking server 118 hosts the networking platform that includes functionalities to perform searches (e.g., job searches) and train classifiers using machine-learning. As shown in FIG. 2, a front end may comprise a user interface module 202 (e.g., the web server 116), which receives requests from various client computing devices (e.g., client device 106) and communicates appropriate responses to the requesting client devices. For example, the user interface module(s) 202 may receive requests in the form of Hypertext Transfer Protocol (HTTP) requests or other web-based API requests.

An application logic layer comprises a search system 206 that may include one or more various application server modules 208 and a search engine 210. The application server module(s) 208, in conjunction with the user interface module(s) 202, generate various user interfaces (e.g., web pages) with data retrieved from various data sources in a data layer. In some embodiments, individual application server modules 208 are used to implement the functionality associated with various applications and/or services provided by the online network.

As shown in FIG. 2, a data layer may include several databases, such as a profile data storage 212 for storing profile data, including both user profile data and profile data for various organizations (e.g., companies, schools). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates), employment history, skills, professional organizations, and so on. This information is stored, for example, in the profile data storage 212. Similarly, when a representative of an organization initially registers the organization with the online network, the representative may be prompted to provide certain information about the organization. This information may be stored, for example, in the profile data storage 212 or another database (not shown).

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. In any case, the various associations and relationships that the users establish with other users, or with other entities and objects, are stored and maintained within a social graph in a social graph data storage 214.

The online networking server 118 may also include (or be coupled to) a job posting data storage 216, which stores and organizes current and past job postings. The job posting data storage 216 also contains information that correlate applications with job postings that are applied-for and/or search terms that were used to arrive at the job postings. Some or all of this information may be used in training a classifier, as will be discussed in more detail below.

In some embodiments, the data storage 212, 214, and 216 may be incorporated into the database(s) 126 in FIG. 1. However, other configurations are also within the scope of the present disclosure.

Figure 3:
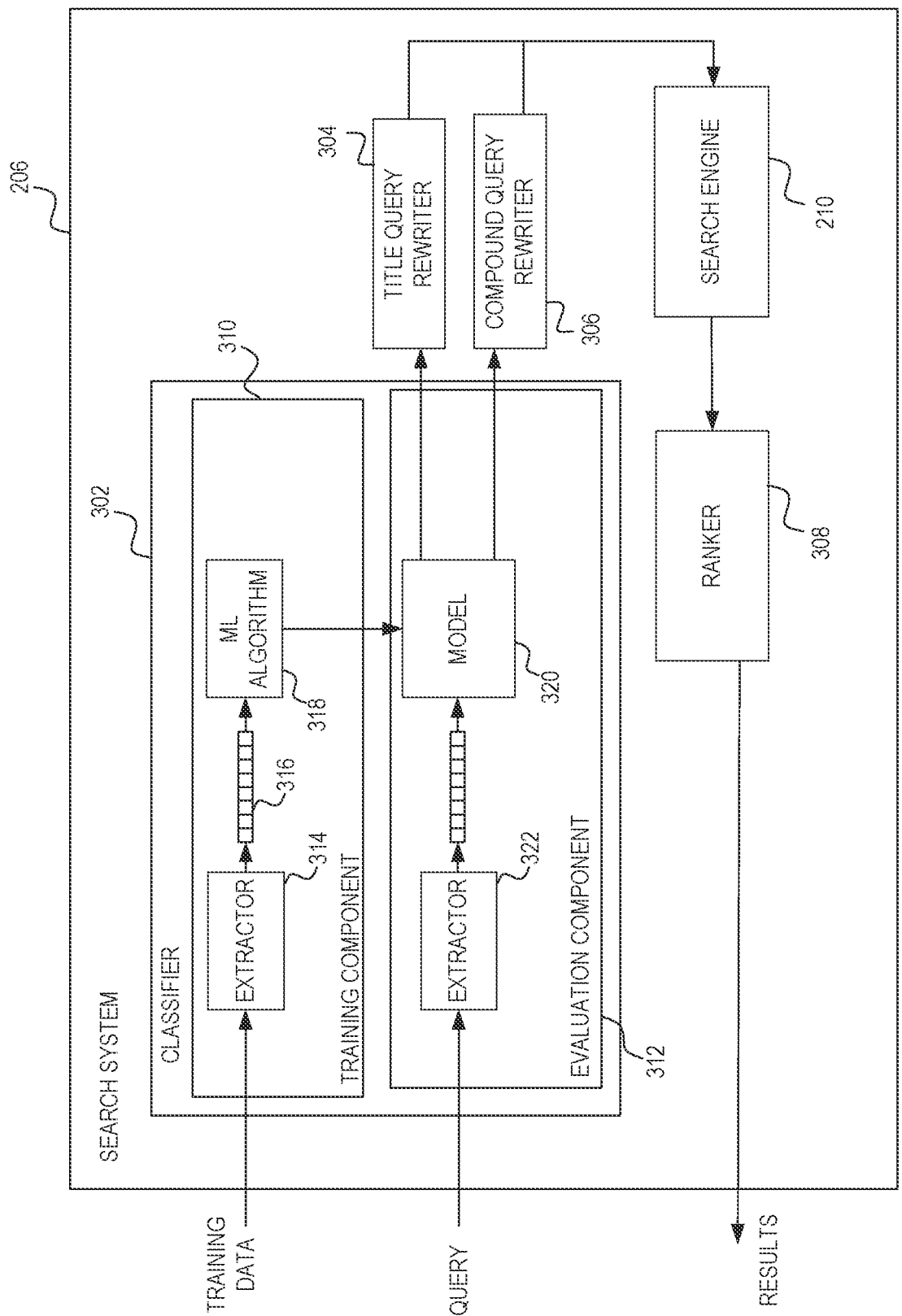
FIG. 3 is a block diagram illustrating components of a search system, according to some example embodiments.

FIG. 3 is a block diagram illustrating components of the search system 206 in the context of a job search system, according to some example embodiments. The search system 206 is configured to train a classifier 302, which during runtime, determines whether to perform a single/particular context search (e.g., title search process) or a multiple context search (e.g., a compound search process). To enable these operations, the search system 206 includes one or more classifiers 302, a title query rewriter 304, a compound query rewriter 306, the search engine 210, and a ranker 308 all configured to communicate with each other (e.g., via a bus, shared memory, or a switch). Additionally, the search system 206 may comprise other components (not shown) that are not pertinent to example embodiments. In example embodiments, the classifier 302 may be used to predict, at runtime, whether to perform the title field search or the compound search. The classifier 302 may include a training component 310 and an evaluation component 312. The training component 310 uses a feature extractor 314 to extract one or more features 316 from training data. The training data is obtained from job application records (e.g., from the job posting data storage 216). The job application records each can contain a raw query (e.g., previous job search query such as search terms), a job identifier (e.g., of an applied-to job posting), and other query information including facets (e.g., selectable filters such as size, industry, remote or work from home), annotations, and locations. Annotations comprise how each part of a query is interpreted. For example, "software engine in California" would be broken down into a first part, "software engine," being annotated or labeled a title and a second part, "California," being annotated as location. Other annotations can include, for example, location, industry, and skills.

In example embodiments, for every job application record, the feature extractor 314 extracts query features including individual terms associated with the job application record. For each term or keyword, the feature extractor 314 can also extracts two additional features: (1) whether the query that lead to the applied-to job posting contains the term and (2) whether the query only contains one term or keyword. The classifier 302 may also extract other words, number of characters in the query (e.g., number of letters), and number of tokens (e.g., number of words) in the query. This information goes into the classifier training.

Example embodiments use a one-hot encoded feature vector to represent the features 316 (e.g., derived from the terms) extracted from each job application record. A numeric vector is used since machine learning models usually only recognize numbers instead of words or terms. In one embodiment, each feature 316 or term is referenced against a 200-dimensional vector (also referred to herein as "feature vector"), where each dimension indicates whether a particular term appears in the search query. For example, for "software engineer," the 200-dimensional vector will have two columns marked as 1.0 (i.e., dimensions corresponding to "software" and "engineer"), while all the other dimensions are marked 0.0. In one embodiment, the training component 310 may restrict to the most frequent terms or keywords for machine-training. For example, the most frequent terms may include "manager," "engineer," and "analyst." While example embodiments are referenced against a 200-dimensional vector, alternative embodiments can use any number-dimensional vector.

The features 316 (e.g., the feature vector) may then be fed to a machine learning algorithm 318 that trains a probabilistic model 320. The model 320 may be specifically trained to determine whether a query should be searched using a single context search process (e.g., the title field search) or the compound search. In one embodiment, the machine learning algorithm 318 "replays" the queries from the job application records. As such, the classifier 302 performs a search for matching results using both a title search process and a compound search process. The results may comprise two counts: (1) whether the search system 202 can retrieve the job posting that was applied for and (2) how many matches are there in total. The classifier 302 then feeds the raw numbers into a probability and loss function (discussed further below).

Example embodiments define a probability that a query will return job postings that will be applied-for with the probabilistic model 320. The model 320 assigns a probability for each job posting being discovered. A probability function and a loss function are trained, by the machine learning algorithm 318, with the features 316 or feature vector. In one embodiment, the probability function and loss function can be expressed as $$Pr(j \mid q) = \frac{I_{j \in title-match(q)}}{|title - match\ (q)|} p(q) + \frac{I_{j \in mme-match(q)}}{|mme - match\ (q)|} (1 - p(q))$$

$$loss = \sum_{(q,j) \in D} -\log Pr(j \mid q)$$

In the equation, j represents job and q represents query. The classifier 302 can have two outcomes. The classifier 302 can select to use a title query/search or to use the compound query/search. The probability function is based on a sum of both. When the classifier 302 uses the title query, then the classifier 302 matches title match job postings. |title-match (q)| is the total number of matched job postings in the probability function for the title query. From among all the matched job postings (e.g., from title and compound query), the classifier 302 randomly selects one job posting that will be returned to the user. "I" is an identity function that is either 1 or 0. If the job posting is useful but does not have a title match then the identity function, I, is 0 and if the job is useful and has a title match result, then I is 1. Thus, the probability of the user finding the job posting useful that has a title match is 1 divided by |title-match (q)| for the title query. The process is similar for the second part of the probability function but based on a compound search (where I is always 1 since the compound search will always find the job posting). The two parts are summed together, and the result is the probability function the classifier 302 is optimizing for and/or minimizing a loss for based on the loss function. A higher probability means the classifier 302 is picking the right query form.

For every query and job posting in the training set (e.g., from the job application records), the probability equation will return a number. During the training process (also referred to as the "machine-learning process"), the classifier 302 tries to optimize such that the overall probability is the highest amount (e.g., maximizing likelihood estimation or minimizing the loss).

During runtime, the search system 206 is configured to perform job searches using the evaluation component 312 of the classifier 302. In example embodiments, the evaluation component 312 receives a job search query and determines a query type. Specifically, the evaluation component 312 determines whether to limit the job search query to a title field search (e.g., a stricter match) or perform a compound search (e.g., a wider match). The title field search limits the search by matching one or more terms of the job search query to a title field of the job postings (also referred to as a "title search"). In contrast, the compound search performs a wider search that matches the one or more terms of the job search query to multiple fields of each job posting (or all fields in the job posting) including, for example, the title field, description field, skills, geolocations, and company.

In example embodiments, a feature extractor 322 of the evaluation component 312 receives the job search query and extracts one or more features. The one or more features can be, or can be derived from, the term(s) of the job search query. The one or more features are then passed to the model 320, which outputs an indication of a query type to be applied to the job search query. As with the training component 310, the one or more features can be passed as a vector (referred to as a "feature vector") to the model 320.

The model 320 determines which query type to be applied to the job search query. In example embodiments, the model 320 takes the extracted feature vector (derived from the extracted features) and applies logistic regression (e.g., applying a dot product with the learned weight vector, then a Sigmoid function). Accordingly, the model 320 outputs a single number between zero and one, which is the probability. An output or probability of greater than or equal to 0.5 results in a title field query type, while an output or probability less than 0.5 results in a compound field query type. For example, assume that the model 320 has a bias term b and a weight vector of 200 dimensions, whereby each dimension is represented as f1, f2, ... f200. Also assume that that feature vector is also 200 dimensions, whereby each dimension is represented as v1, v2, ... v200. The logistic regression function can be expressed as: sigmoid (b+f1*v1+f2*v2+ ... f200*v200) with the output being between zero and one.

Once the model 320 determines the query type, the job search query (e.g., the one or more features) is passed to either the title query rewriter 304 or the compound query rewriter 306 based on the output. More specifically, a job search query that is determined to be best implemented as a title field search is passed to the title query rewriter 304, while a job search query that is determined to be best implemented as a compound search is passed to the compound query rewriter 306. The title query rewriter 304 and the compound query rewriter 306 are configured to format the job search query into a machine language format (e.g., Galene format). The title query rewriter 304 and the compound query rewriter 306 each applies rules to translate the job search query into the machine understandable format. For example, the title query rewriter 304 can format the job search query "director" to "+jobTitle:director." In contrast, the compound query rewriter 306 can, for example, format the job search query "engineer" to "+jobTitle:engineer+jobDescription:engineer" to perform a compound search against both the title field and the description field.

Once the job search query is formatted or rewritten into machine language format, the formatted job search query is passed to the search engine 210. The search engine 210 takes the formatted job search query and matches term(s) of the formatted job search query against job postings on the online network platform (e.g., stored in the data storage 122). For the title field search, the search engine 210 only searches for matching terms in the title fields, whereas for the compound search, the search engine 210 searches for matching terms in multiple or all areas of the job posting including, for example, the title field and the description field.

The results are then presented to the ranker 308 by the search engine 210. The ranker 308 ranks the results and provides a top number of results (also referred to as "recommendations") for presentation to the user. The results can be ranked, for example, based on newest (or date posted), location, or relevancy. In some embodiments, the ranker 308 ranks all of the results. In other embodiments, the ranker 308 selects a portion of the most recent job postings in the results to rank. While the ranker 308 is shown separate from the search engine 210, some embodiments may include the ranker 308 within the search engine 210.

Figure 4:
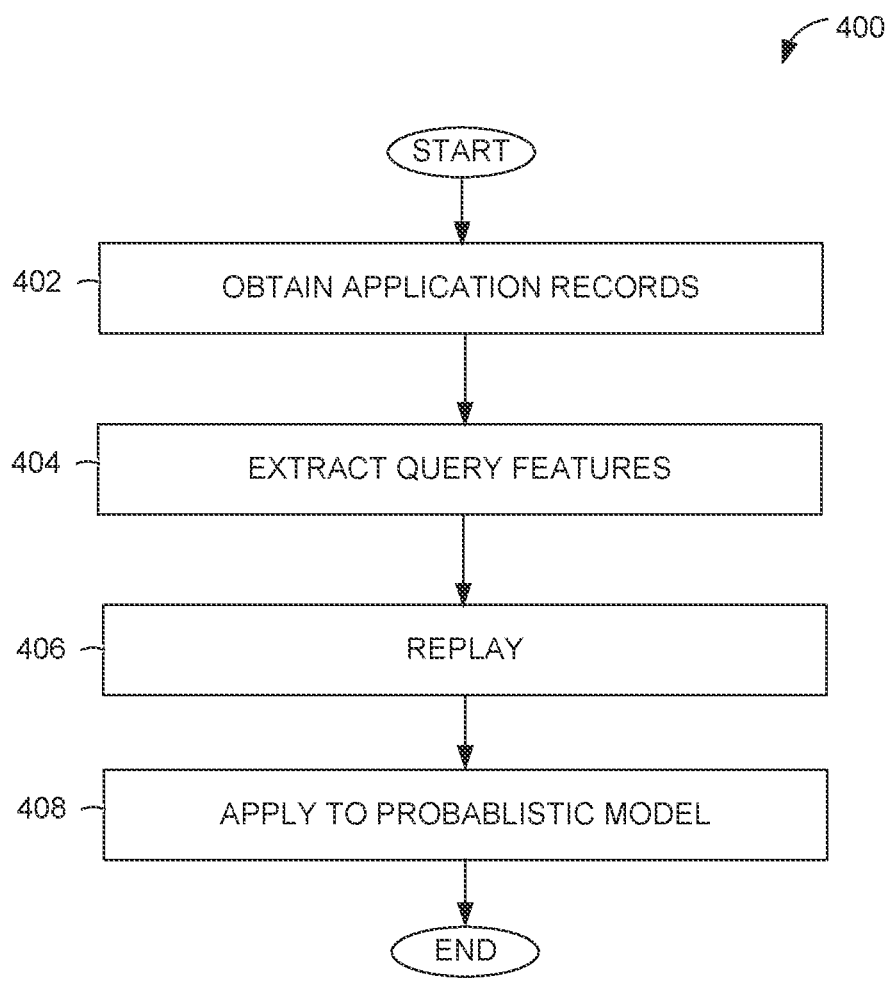
FIG. 4 is a flowchart illustrating operations of a method for training the classifier using machine-learning, according to some example embodiments.

FIG. 4 is a flowchart illustrating operations of a method 400 for training the classifier (e.g., classifier 302) using machine-learning, according to some example embodiments. Operations in the method 400 may be performed by the networking server 118 of the network system 102, using components described above with respect to FIGS. 2 and 3. Accordingly, the method 400 is described by way of example with reference to the networking server 118. However, it shall be appreciated that at least some of the operations of the method 400 may be deployed on various other hardware configurations or be performed by similar components residing elsewhere in the network environment 100. Therefore, the method 400 is not intended to be limited to the networking server 118.

In operation 402, job application records are accessed by the classifier 302. More specifically, job application records are accessed from the job posting data storage 216 and provided to the feature extractor 314 in the training component 310. The job application records each can contain a raw query (e.g., previous job search query), job identifier (e.g., of an applied-to job), and other information from the various fields of the applied-to job posting.

In operation 404, the feature extractor 314 in the classifier 302 extracts features from each of the job application records. In some embodiments, the extracted features include the term(s) of each query.

In operation 406, the classifier 302 replays the queries from the job application records. Therefore, the classifier 302 triggers a search for matching results using both a title field search process and a compound search process.

The results of the replay are applied to the model 320 that includes a loss function (and/or probability function) in operation 408. For every query and job posting in the training set (e.g., the job application records), the probability equation will return a number. During the training process, the classifier 302 tries to optimize such that the overall probability is the highest amount (e.g., maximum likelihood estimation or minimizing the loss).

Figure 5:
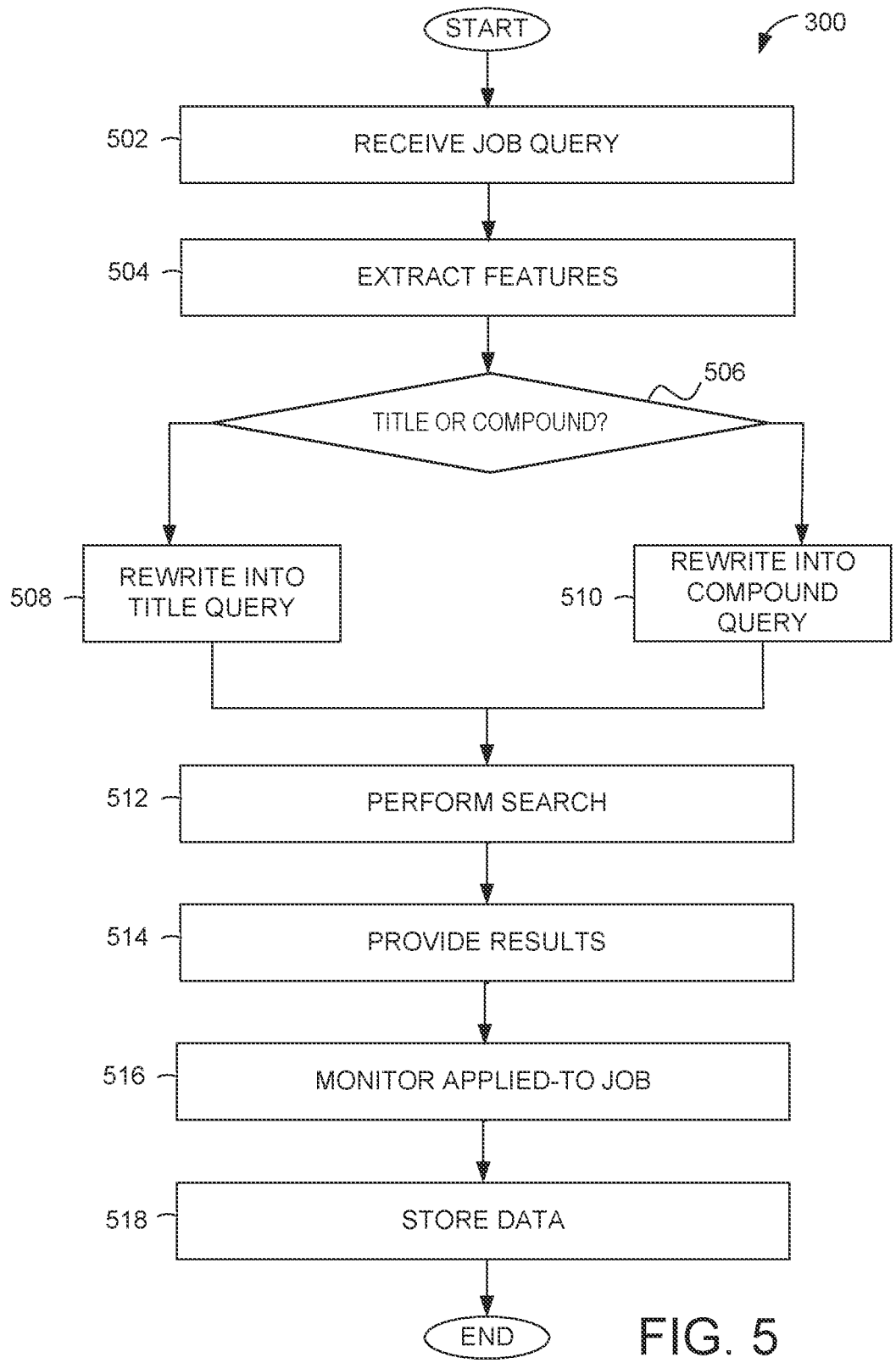
FIG. 5 is a flowchart illustrating operations of a method for performing a job search using a trained classifier, according to some example embodiments.

FIG. 5 is a flowchart illustrating operations of a method 500 for performing a job search using the trained classifier 302, according to some example embodiments. Operations in the method 500 may be performed by the network system 102, using components described above with respect to FIGS. 2 and 3. Accordingly, the method 500 is described by way of example with reference to the network system 102 and the networking server 118. However, it shall be appreciated that at least some of the operations of the method 500 may be deployed on various other hardware configurations or be performed by similar components residing elsewhere in the network environment 100. Therefore, the method 500 is not intended to be limited to the network system 102.

In operation 502, the search system 206 receives a job search query. More specifically, the trained classifier 302 of the search system 206 receives the job search query. The job search query comprises one or more terms or keywords.

In operation 504, the feature extractor 322 extracts feature(s) from the job search query. More specifically, the terms of the job search query are extracted. The features are then passed to the model 320 as a feature vector that is derived from the extracted features.

In operation 506, the model 320 determine a query type to be implemented for the job search query. Specifically, the model 320 takes the feature vector and applies a logistic regression to the feature vector. In one embodiment, the logistic regression function may be expressed as: sigmoid (b+f1*v1+f2*v2+ ... fn*vn) with n being the dimension of the feature vector and the output being between zero and one. An output or probability of greater than or equal to 0.5 results in a title field query type, while an output or probability less than 0.5 results in a compound field query type. Thus, based on the output of the logistic function, the model 320 makes a determination whether the job search query is classified as a title field query (e.g., perform a title field search process) or whether the job search query is classified as a compound query (e.g., perform a compound search process using multiple fields).

If in operation 506 the model 320 outputs that the job search query is classified as a title field query, then in operation 508, the job search query is rewritten into machine understandable title field search format. More specifically, a job search query that is classified as the title field query is passed to the title query rewriter 304 which formats the job search query for a title field search by applying rules to translate the terms of the job search query into the corresponding machine understandable (language) format. For example, the title query rewriter 206 can format the job search query "director" to "+jobTitle:director."

If in operation 506 the model 320 outputs that the job search query is classified as a compound query, then in operation 510, the job search query is rewritten into machine understandable compound search format. More specifically, the job search query is passed to the compound query rewriter 208, which formats the job search query for a compound search by applying rules to translate the terms of the job search query into the corresponding machine understandable (language) format. For example, the compound query rewriter 208 can format the job search query "data analysis" to "+jobTitle:data+jobTitle:analyst+jobDescription:data+jobDescription:analyst."

In operation 512, the search engine 210 performs the job search. The search engine 210 takes the formatted job search query and matches term(s) of the job search query against job postings (e.g., one or more fields of the job postings) on the network platform (e.g., stored in the data storage 122). For the title search process, the search engine 210 only searches for matching terms in a job posting's title field, whereas for the compound search process, the search engine 210 searches for matching terms in multiple areas of the job posting such as the title field and description field.

In operation 514, the results are provided to the user. In example embodiments, the results from the search engine 210 are ranked by the ranker 308 prior to being provided to the user. In some cases, the ranker 308 may select a top number of ranked results to be returned to the user. The providing of the results comprises causing the results to be displayed on a user interface on the client device 106 of the user.

In operation 516, the network system 102 monitors for applied-to job postings based on the job search queries. The network system 102 then stores the data (e.g., the job application records) in operation 518. The stored data can be used for future machine-learning to refine the classifier 302.

Figure 6:
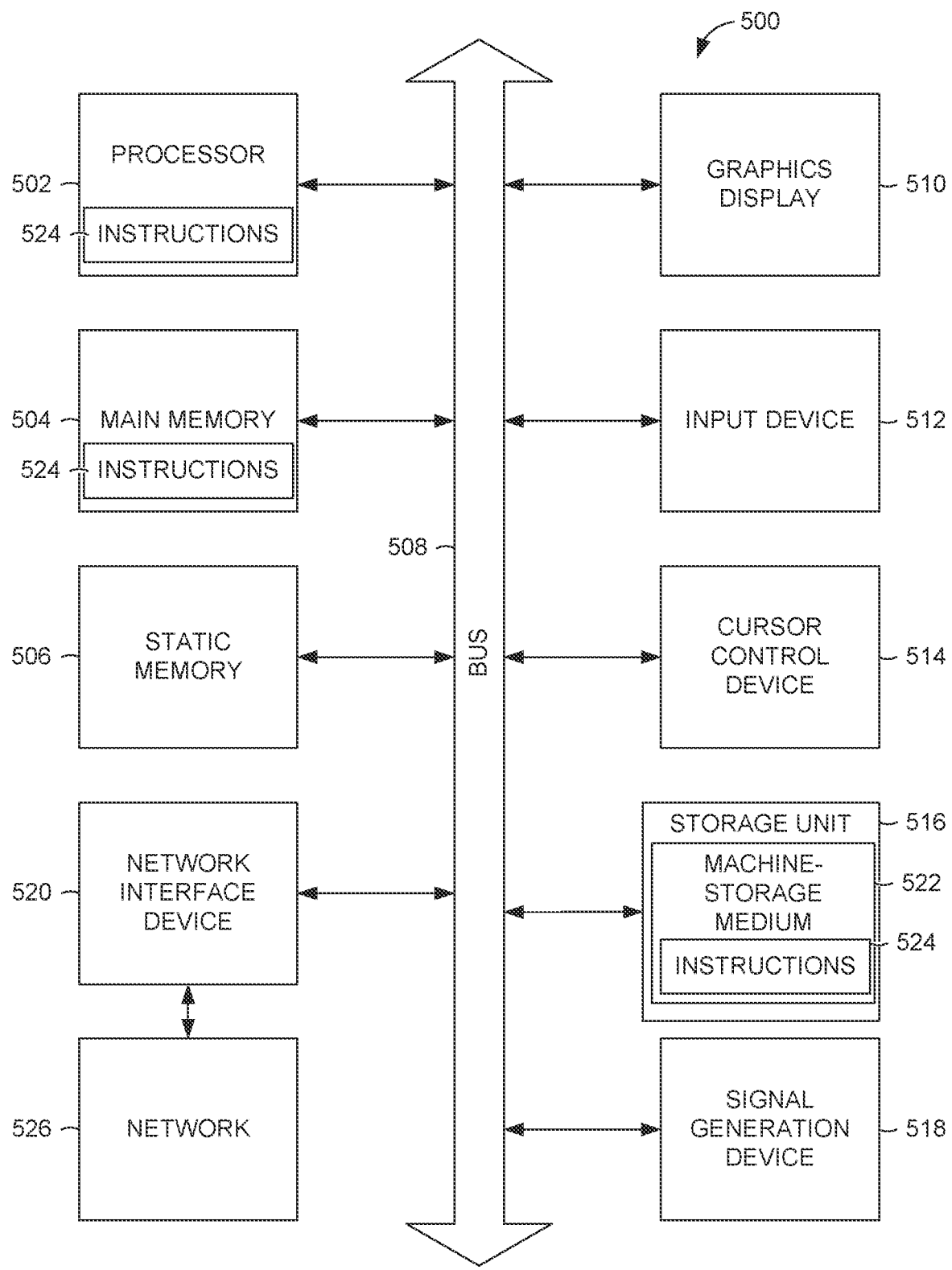
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the block and flow diagrams of FIGS. 4 and 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for classifying job search queries for improved precision using a machine-trained classifier. The method comprises receiving a job search query from a device of a user, the job search query including one or more terms; extracting one or more features from the job search query, the one or more features being derived from the one or more terms; based on the one or more features, determining, using a machine-learned model of a classifier, whether to use a title field search process that searches title fields or a compound search process that searches multiple fields; based on the determining, formatting the job search query into a corresponding machine-language format; using the corresponding machine-language format, performing, by one or more hardware processors of a search engine, the job search query to derive results; and causing presentation of the results on the device of the user.

In example 2, the subject matter of example 1 can optionally include wherein the formatting the job search query comprises using a title query rewriter to format the job search query into a machine-language format that performs a search of the title fields of job postings based on the determining to use the title field search process.

In example 3, the subject matter of any of examples 1-2 can optionally include wherein the formatting the job search query comprises using a compound query rewriter to format the job search query into a machine-language format that performs a search on the multiple fields of job postings based on the determining to use the compound search process.

In example 4, the subject matter of any of examples 1-3 can optionally include ranking the results of the job search query prior to the causing presentation of the results.

In example 5, the subject matter of any of examples 1-4 can optionally include training the machine-learned model of the classifier using job application records, the job application records each indicating at least a previous job search query and a job identifier of a corresponding applied-to job posting.

In example 6, the subject matter of any of examples 1-5 can optionally include wherein the training the machine-learned model of the classifier comprises extracting query features from the job application records including one or more terms of each previous query of the job application records; and replaying each of the previous queries of the job application records, the replaying comprising performing searches for matching results using both the title field search process and the compound search process based on the one or more terms of each previous query.

In example 7, the subject matter of any of examples 1-6 can optionally include wherein the training the machine-learned model of the classifier further comprises applying results of the replaying to the machine-learned model, the machine-learned model comprising a probability function and a loss function.

In example 8, the subject matter of any of examples 1-7 can optionally include wherein the machine-learned model maximizes an overall probability based on a summation of a title search probability and a compound search probability.

Example 9 is a system for classifying job search queries for improved precision using a machine-trained classifier. The system includes one or more hardware processors and a memory storing instructions that, when executed by the one or more hardware processors, causes the one or more hardware processors to perform operations comprising receiving a job search query from a device of a user, the job search query including one or more terms; extracting one or more features from the job search query, the one or more features being derived from the one or more terms; based on the one or more features, determining, using a machine-learned model of a classifier, whether to use a title field search process that searches title fields or a compound search process that searches multiple fields; based on the determining, formatting the job search query into a corresponding machine-language format, using the corresponding machine-language format, performing, the job search query to derive results; and causing presentation of the results on the device of the user.

In example 10, the subject matter of example 9 can optionally include wherein the formatting the job search query comprises using a title query rewriter to format the job search query into a machine-language format that performs a search of the title fields of job postings based on the determining to use the title field search process.

In example 11, the subject matter of example 9-10 can optionally include wherein the formatting the job search query comprises using a compound query rewriter to format the job search query into a machine-language format that performs a search on the multiple fields of job posting based on the determining to use the compound search process.

In example 12, the subject matter of example 9-11 can optionally include wherein the operations further comprise ranking the results of the job search query prior to the causing presentation of the results.

In example 13, the subject matter of example 9-12 can optionally include wherein the operations further comprise training the machine-learned model of the classifier using job application records, the job application records each indicating at least a previous job search query and a job identifier of a corresponding applied-to job posting.

In example 14, the subject matter of example 9-13 can optionally include wherein the training the machine-learned model of the classifier comprises extracting query features from the job application records including one or more terms of each previous query of the job application records; and replaying each of the previous queries of the job application records, the replaying comprising performing searches for matching results using both the title field search process and the compound search process based on the one or more terms of each previous query.

In example 15, the subject matter of any of examples 9-14 can optionally include wherein the training the machine-learned model of the classifier further comprises applying results of the replaying to the machine-learned model, the machine-learned model comprising a probability function and a loss function.

In example 16, the subject matter of any of examples 9-15 can optionally include wherein the machine-learned model maximizes an overall probability based on a summation of a title search probability and a compound search probability.

Example 17 is a system for improved precision using a machine-trained classifier. The system comprises means for receiving a job search query from a device of a user, the job search query including one or more terms; means for extracting one or more features from the job search query, the one or more features being derived from the one or more terms; means for determining, using a machine-learned model of a classifier, whether to use a title field search process that searches title fields or a compound search process that searches multiple fields based on the one or more features; means for formatting the job search query into a corresponding machine-language format based on the determining; means for performing the job search query to derive results using the corresponding machine-language format; and causing presentation of the results on the device of the user.

In example 18, the subject matter of example 17 can optionally include means for training the machine-learned model of the classifier using job application records, the job application records each indicating at least a previous job search query and a job identifier of a corresponding applied-to job posting.

In example 19, the subject matter of example 17-18 can optionally include wherein the means for training the machine-learned model of the classifier comprises means for extracting query features from the job application records including one or more terms of each previous query of the job application records; means for replaying each of the previous queries of the job application records, the replaying comprising performing searches for matching results using both the title field search process and the compound search process based on the one or more terms of each previous query; and means for applying results of the replaying to the machine-learned model, the machine-learned model comprising a probability function and a loss function.

In example 20, the subject matter of example 17-19 can optionally include wherein the machine-learned model maximizes an overall probability based on a summation of a title search probability and a compound search probability.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving a job search query from a device of a user, the job search query including one or more terms;
    extracting one or more features from the job search query, the one or more extracted features being derived from the one or more terms;
    based on the one or more extracted features, classifying, using a machine-learned model of a classifier, the job search query as either a title field query or a compound query, the classifying comprising:
        applying logistic regression to a vector based on the extracted features; and
        based on an output of a probability of greater than or equal to 0.5, classifying the job search query as the title field query or based on an output of a probability of less than 0.5, classifying the job search query as the compound query, the title field query triggering a search of only a title field of at least one job posting and the compound query triggering a search of multiple fields of the at least one job posting including the title field and a description field;
    based on the classifying, transmitting the job search query to one of a plurality of query rewriters, including a title query rewriter that rewrites the job search query into the title field query and a compound query rewriter that rewrites the job query into the compound query;
    responsive to the transmitting, rewriting, by either the title query rewriter or the compound query rewriter, the job search query into a corresponding machine-language formatted query;
    using the corresponding machine-language formatted query, searching, by one or more hardware processors of a search engine, only the title field of the at least one job posting for the title field query or searching multiple fields of the at least one job posting for the compound; and
    causing presentation of results of the searching on the device of the user.

2. The method of claim 1, wherein the rewriting the job search query comprises using the title query rewriter to rewrite the job search query into a machine-language format that performs a search of only the title field of the at least one job posting.

3. The method of claim 1, wherein the rewriting the job search query comprises using the compound query rewriter to rewrite the job search query into a machine-language format that performs a search on the multiple fields of the at least one job posting.

4. The method of claim 1, further comprising training the machine-learned model of the classifier using job application records, the job application records each indicating at least a previous job search query and a job identifier of a corresponding applied-to job posting.

5. The method of claim 4, wherein the training the machine-learned model of the classifier comprises:
    extracting query features from the job application records including one or more terms of each previous query of the job application records; and
    replaying each of the previous queries of the job application records, the replaying comprising performing searches for matching results using both a title field search process that only searches title fields and a compound search process that searches multiple fields based on the one or more terms of each previous query.

6. The method of claim 5, wherein the training the machine-learned model of the classifier further comprises:
    applying results of the replaying to the machine-learned model, the machine-learned model comprising a probability function and a loss function.

7. The method of claim 1, wherein the machine-learned model maximizes an overall probability based on a summation of a title search probability and a compound search probability.

8. A system comprising:
    one or more hardware processors; and
    a memory storing instructions that, when executed by the one or more hardware processors, cause the one or more hardware processors to perform operations comprising:
    receiving a job search query from a device of a user, the job search query including one or more terms;

extracting one or more features from the job search query, the one or more extracted features being derived from the one or more terms;
based on the one or more extracted features, classifying, using a machine-learned model of a classifier, the job search query as either a title field query or a compound query, the classifying comprising:
applying logistic regression to a vector based on the extracted features; and
based on an output of the machine-learned model of a probability of greater than or equal to 0.5, classifying the job search query as the title field query or based on an output of a probability of less than 0.5, classifying the job search query as the compound query, the title field query triggering a search of only a title field of at least one job posting and the compound query triggering a search of multiple fields of the at least one job posting including the title field and a description field;
based on the classifying, transmitting the job search query to one of a plurality of query rewriters, including a title query rewriter that rewrites the job search query into the title field query and a compound query rewriter that rewrites the job query into the compound query;
responsive to the transmitting, rewriting, by either the title query rewriter or the compound query rewriter, the job search query into a corresponding machine-language formatted query;
using the corresponding machine-language formatted query, searching only the title field of the at least one job posting for the title field query or searching multiple fields of the at least one job posting for the compound query; and
causing presentation of results of the searching on the device of the user.

9. The system of claim 8, wherein the rewriting the job search query comprises using the title query rewriter to rewrite the job search query into a machine-language format that performs a search of only the title field of the at least one job posting.

10. The system of claim 8, wherein the rewriting the job search query comprises using the compound query rewriter to rewrite the job search query into a machine-language format that performs a search on the multiple fields of the at least one job posting.

11. The system of claim 8, wherein the operations further comprise ranking the results of the title field query or the compound query prior to the causing presentation of the results.

12. The system of claim 8, wherein the operations further comprise training the machine-learned model of the classifier using job application records, the job application records each indicating at least a previous job search query and a job identifier of a corresponding applied- to job posting.

13. The system of claim 12, wherein the training the machine-learned model of the classifier comprises:
extracting query features from the job application records including one or more terms of each previous query of the job application records; and
replaying each of the previous queries of the job application records, the replaying comprising performing searches for matching results using both a title field search process that only searches title fields and a compound search process that searches multiple fields based on the one or more terms of each previous query.

14. The system of claim 13, wherein the training the machine-learned model of the classifier further comprises:

applying results of the replaying to the machine-learned model, the machine-learned model comprising a probability function and a loss function.

15. The system of claim 8, wherein the machine-learned model maximizes an overall probability based on a summation of a title search probability and a compound search probability.

16. A machine-storage medium storing instructions that, when executed by one or more hardware processors of a machine, cause the machine to perform operations comprising:
receiving a job search query from a device of a user, the job search query including one or more terms;
extracting one or more features from the job search query, the one or more extracted features being derived from the one or more terms; based on the one or more extracted features, classifying, using a machine-learned model of a classifier, the job search query as either a title field query or a compound query, the classifying comprising:
applying logistic regression to a vector based on the extracted features; and
based on an output of the machine-learned model of a probability of greater than or equal to 0.5, classifying the job search query as the title field query or based on an output of a probability of less than 0.5, classifying the job search query as the compound query, the title field query triggering a search of only a title field of at least one job posting and the compound query triggering a search of multiple fields of the at least one job posting including the title field and a description field;
based on the classifying, transmitting the job search query to one of a plurality of query rewriters, including a title query rewriter that rewrites the job search query into the title field query and a compound query rewriter that rewrites the job query into the compound query;
responsive to the transmitting, rewriting, by either the title query rewriter or the compound query rewriter, the job search query into a corresponding machine-language formatted query;
searching only the title field of the at least one job posting for the title field query or searching multiple fields of the at least one job posting for the compound search query using the corresponding machine-language formatted query; and
causing presentation of results of the searching on the device of the user.

17. The machine-storage medium of claim 16, wherein the operations further comprise training the machine-learned model of the classifier using job application records, the job application records each indicating at least a previous job search query and a job identifier of a corresponding applied- to job posting.

18. The machine-storage medium of claim 17, wherein the training the machine-learned model of the classifier comprises:
extracting query features from the job application records including one or more terms of each previous query of the job application records;
replaying each of the previous queries of the job application records, the replaying comprising performing searches for matching results using both a title field search process that only searches title fields and a compound search process that searches multiple fields based on the one or more terms of each previous query; and applying results of the replaying to the machine-learned model, the machine-learned model comprising a probability function and a loss function.

\* \* \* \* \*